US010255168B2

(12) United States Patent
Stefan et al.

(10) Patent No.: US 10,255,168 B2
(45) Date of Patent: Apr. 9, 2019

(54) METHOD AND DEVICE FOR GENERATING TEST CASES FOR AUTONOMOUS VEHICLES

(71) Applicant: FORD GLOBAL TECHNOLOGIES, LLC, Dearborn, MI (US)

(72) Inventors: Frederic Stefan, Aachen (DE); Alain Marie Roger Chevalier, Henri-Chapelle (BE); Michael Marbaix, Haillot (BE); Evangelos Bitsanis, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 260 days.

(21) Appl. No.: 15/340,856

(22) Filed: Nov. 1, 2016

(65) Prior Publication Data
US 2017/0132117 A1 May 11, 2017

(30) Foreign Application Priority Data
Nov. 6, 2015 (DE) .................. 10 2015 221 886

(51) Int. Cl.
*G06F 11/00* (2006.01)
*G06F 11/36* (2006.01)
(52) U.S. Cl.
CPC ...... *G06F 11/3684* (2013.01); *G06F 11/3604* (2013.01)
(58) Field of Classification Search
CPC ............... G06F 11/3684; G06F 11/368; G06F 11/3604; G01M 17/007; B60W 50/00;
(Continued)

(56) References Cited

U.S. PATENT DOCUMENTS 7,194,888 B1 * 3/2007 Temkin ............... G01M 17/04
73/11.04
7,813,888 B2 * 10/2010 Vian .................. F41G 7/303
702/1
(Continued)

FOREIGN PATENT DOCUMENTS

DE 102007053500 A1 12/2008
DE 102008027526 A1 12/2009
(Continued)

OTHER PUBLICATIONS

Miguel C. Figueiredo et al., An Approach to Simulate Autonomous Vehicles in Urban Traffic Scenarios, Faculty of Engineering, University of Porto, Porto, Portugal, 2009, 6 pgs.
(Continued)

*Primary Examiner* — Marc Duncan
(74) *Attorney, Agent, or Firm* — Frank A. MacKenzie; Brooks Kushman P.C.

(57) ABSTRACT

Test cases for autonomous vehicles are generated automatically by using data which have been collected from vehicles participating in public road traffic. A test planning system for autonomous vehicle includes defined application cases for autonomous vehicles. The vehicles are configured to identify test cases with prediction analyzes of a reference catalog of driving situations and the defined application cases, and compare, via a comparative analyzes, the test cases and the defined application cases to compile an expanded set of test cases, wherein the expanded set of test cases are compared to the defined application cases to output a complete set of test cases. The system also includes a central database configured to query the complete set of test cases.

17 Claims, 1 Drawing Sheet

(58) Field of Classification Search
CPC .......... B60W 50/0097; B60W 50/0098; G05D 1/0088
See application file for complete search history.

(56) References Cited

U.S. PATENT DOCUMENTS

| | | | | |
|---|---|---|---|---|
| 8,712,633 | B2* | 4/2014 | Sul | G06F 11/3684 701/29.1 |
| 8,862,346 | B2* | 10/2014 | Saltsman | G01M 17/007 701/51 |
| 9,524,230 | B2* | 12/2016 | Kalyanasundram | G06F 11/3688 |
| 9,836,895 | B1* | 12/2017 | Nygaard | G06F 17/5009 |
| 9,858,621 | B1* | 1/2018 | Konrardy | H04W 4/90 |
| 10,077,056 | B1* | 9/2018 | Fields | B60W 40/09 |
| 2014/0115565 | A1* | 4/2014 | Abraham | G06F 8/30 717/128 |
| 2018/0329411 | A1* | 11/2018 | Levinson | G01S 7/4972 |

FOREIGN PATENT DOCUMENTS

| | | |
|---|---|---|
| DE | 102011088807 A1 | 6/2013 |
| EP | 2402827 A1 | 1/2012 |

OTHER PUBLICATIONS

German Search Report dated Feb. 6, 2016 for German Application No. 102015221886.4, 5 pgs.

Bock, T. et al., "Vehicle in the Loop Ein innovativer Ansatz zur Kopplung virtueller mit realer Erprobung", Jan. 2008, 8 pgs.

Gechter, F. et al., "Towards a Hybrid Real/Virtual Simulation of Autonomous Vehicles for Critical Scenarios", The Sixth International Conference on Advances in System Simulation, 2014, pp. 14-17.

* cited by examiner

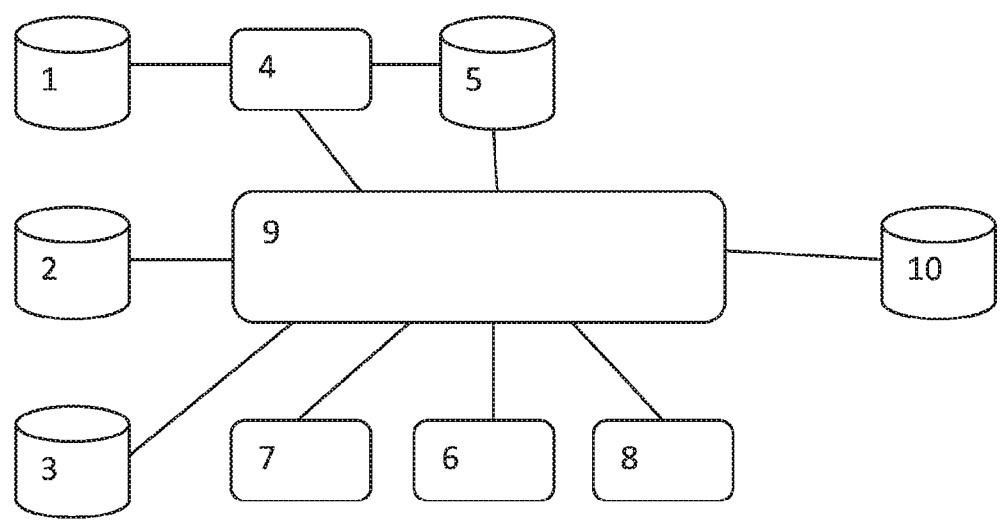

METHOD AND DEVICE FOR GENERATING TEST CASES FOR AUTONOMOUS VEHICLES

CROSS-REFERENCE TO RELATED APPLICATIONS

This application claims foreign priority benefits under 35 U.S.C. § 119(a)-(d) to DE 10 2015 221 886.4 filed Nov. 6, 2015, which is hereby incorporated by reference in its entirety.

TECHNICAL FIELD

This disclosure relates to a method and a device for generating test cases for autonomous vehicles.

BACKGROUND

For software verification and validation at the system level, a set of stimuli and expected reactions of the system are traditionally specified. The stimuli and expected reactions are derived directly from corresponding requirements. The scope of these requirements, and therefore also the scope of the test cases, are generally restricted to a finite set of identified application cases. Typically, the test cases are specified by test engineers by using software test tools. Such tools may comprise functions for assisting test automation and for increasing the test maturity (version management, task tracker, graphical test specification, etc.).

There are also formal verification methods for more systematic checks that software implementations do not infringe particular rules.

The testing of software for autonomous vehicles at the system level entails the new challenge that the set of application cases belonging to such a system is almost infinite. In fact, a system must thus be capable of dealing with most driving situations with which any driver is possibly confronted during his life. Different drivers are faced with different types of application cases, depending on a large number of environmental factors (other road users, time of day, weather, health, vehicle wear, road condition, etc.). There therefore seems to be an extremely large number of test combinations.

Virtual test environments for autonomous vehicles are known. For instance, the publication "Vehicle in the Loop" in Journal "Elektrointegration", ATZ 01/2008 vol. 110, pp. 2-8, describes a test and simulation environment for driver assistance systems, in which a real test vehicle, which moves not in public road traffic but on a free surface or a testing area, is combined with a driving simulator. With such a test setup, referred to as a "Vehicle in the Loop", it is possible to test without risk how driver assistance functions react to other virtual traffic or other virtual objects in a virtual driving environment.

The publication "Towards a Hybrid Real/Virtual Simulation of Autonomous Vehicles for Critical Scenarios", SIMUL 2014, ISBN 978 1 61208 371 1, pp. 14-17, describes hybrid real/virtual simulations of autonomous vehicles for critical situations, specifically with virtual sensors and a real vehicle as "Hardware in the simulation loop".

There is, however, still a need for improved tools and methods which can generate test cases for autonomous vehicles more efficiently.

SUMMARY

The object of the disclosure is to allow automatic generation of test cases for autonomous vehicles at the system level, and in particular to assist engineers in identifying at the system level all tests which are necessary in order to verify the operation of autonomous vehicles.

The method according to the disclosure makes use of up to 3 types of input variables: real driver experience of drivers (mass data); application cases defined for autonomous vehicles; and special application cases, which are possibly required by safety and reliability processes.

A generated test case may be a placeholder, i.e. the system generates a test case title and a brief explanation in higher-level programming language of what is intended to be tested. In particular, a test case may be directly a description in higher-level programming language and formal test instructions, which can be interpreted by a machine.

It is therefore possible to react to the new challenges of software tests for the autonomous vehicles being developed by providing an automated platform for efficient identification of suitable test cases at the system level.

The method according to the disclosure is based on the analysis of at least one data source from real driver experience as an input variable, and preferably also predefined system application cases and safety- and reliability-related system application cases as further input variables.

The real driver experience is the collected experience of drivers of a multiplicity of vehicles of a fleet of vehicles over relatively long periods of time in the real world. The drivers are, for example, all those who drive a vehicle of a particular brand or a particular type. Mass data are collected, for example CAN bus data, sensor data, vehicle communication data, etc. All these data are analyzed and classified in order to identify driving situations and to compile a collection of driving situations together with their frequency. Driving situations may be classified by different methods. For example a catalogue may give a rough indication of what types of situations are relevant, for example being stationary, accelerations, emergency braking, starting the engine, etc. Alternatively, a classification algorithm may compile groups of driving situations in terms of different features, for example vehicle speed, engine speed, pedal use, etc.

On the basis of the driving situations identified in such a way, test cases are generated, which are referred to here as test cases from the real world. The various steps that lead to a particular driving situation, and the average reaction of the drivers may also be analyzed. This information then forms the basis for the generation of test case steps and acceptance criteria. One example of a representative test case that may be identified is the gentle slowing and stopping of a vehicle at traffic lights. The identification of driving situations and the generation of test cases may typically be carried out with the aid of mass data and prediction analyses.

In model-based system development, it is general practice to define system application cases that represent the interaction between the vehicle, the driver and the environment. Such application cases may be described in text form or by means of modeling languages, for example UML or SysML. In fact, an application case may be considered very simply as a test case. In the present case, however, a comparative analysis is preferably carried out between application cases that are based on test cases and the application cases identified by analysis of data from the real world, and when comparable cases are detected, these being merged to form one case. In this case, this merging, which may also be represented as a union operator in group theory, may be carried out according to various conventions. For example, priority may be given to the "theoretical" case, i.e. the cases obtained from predefined application cases or safety- and reliability-related application cases, and "real-world cases" of the same type may be deleted.

It is, however, also conceivable to take aspects from both case types into account for the merging. The predefined application case may for example be used as a frame for the case definition and in order to supplement details from the "real-world case", for example an actually measured speed profile.

Special application cases that are dedicated to safety processes, for example ISO 26262, or reliability processes, for example FMEA, must likewise be kept. If safety/reliability test cases have already been covered by some test cases from the real world, they may be correspondingly marked in the method since such test cases possibly require other test methods, for example formal testing.

A description of an exemplary embodiment with the aid of the drawing follows.

BRIEF DESCRIPTION OF THE DRAWINGS

The FIGURE shows an overview of a system for automatically generating test cases for autonomous vehicles at the system level.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Referring to the FIGURE, in a block 1 that comprises a central database, data that are obtained from real vehicles in the real world, in particular vehicles participating in normal public road traffic, which need not be autonomous or autonomously controlled but may be controlled by human drivers, are collected continuously.

In a block 2, system application cases for autonomous vehicles, or for a particular vehicle type of such a kind, are defined.

In a block 3, safety- and reliability-related system application cases are defined for autonomous vehicles, or for a particular vehicle type of such a kind.

In a block 4, with the aid of mass data collected, prediction analyses are carried out in order to identify representative test cases from the real world. To this end, for example, it is possible to use a pattern recognition algorithm into which a reference catalogue of typical driving situations, the system application cases and/or the safety- and reliability-related system application cases are entered.

In a block 6, a comparative analysis is carried out in order to compare the test cases from the real world obtained in a block 5 and the application case-based test cases obtained in block 2, "duplicates" being merged with the aid of predetermined rules to form a single test case. To this end, priority rules may be specified (for example priority to the application case-based test cases or the test cases from the real world), or particular data from the two cases may be combined. This step merges the contents of blocks 2 and 5 in order to compile an expanded set of test cases.

In a block 7, a comparative analysis is carried out in order to compare the expanded set of test cases obtained in block 6 with the safety- and reliability-related system application cases obtained in block 3. Here again, duplicates may be merged according to predetermined rules in order to form a data set. This step merges the contents of blocks 6 and 3 and delivers a more complete set of test cases for autonomous vehicles.

Optionally test step instructions and acceptances for each test case are generated in a block 8 on the basis of the data from the real world obtained in block 1.

Block 9 represents a central test planning system. This test planning system may be controlled by a tool for project life cycle management and/or application life cycle management, in order to generate and query test cases suitable for autonomous vehicles. The central test planning system may be provided with rules for continuous integration in order to regularly update the test cases from the real world, namely by regular starting of block 4. This makes it possible to automatically generate new test cases which occur only very rarely or which can be identified only in very special situations.

Block 10 represents the complete set of test cases for autonomous vehicles obtained in block 9, which may be used by test engineers for test documentation and/or for carrying out tests, either manually or automatically.

The working principle of the system described above for automatically generating test cases for autonomous vehicles at the system level will now be explained in more detail with the aid of a simple example with reference to the FIGURE.

In this example, a test engineer is intended to configure tests of an autonomous vehicle in such a way that its software can slow the vehicle to a stop in urban traffic when this is required. This may happen in a large number of possible situations. For this task, the test engineer would like to discover which test scenario is to be defined in order to achieve a representative set of test cases.

The test engineer has predefined the following test scenario in block 2 and entered it into block 9:
   tests that slow the vehicle to a stop when it is approaching a stationary vehicle or a stationary line of vehicles
   tests that slow the vehicle to a stop when it is approaching a pedestrian crossing with a pedestrian crossing the road
   tests that slow the vehicle to a stop when it is approaching a stop sign With block 1, a central database is available which contains records of journeys of vehicles in the real world, which have been made for several years. Data about a variety of vehicle types, a variety of vehicle environments, and the like are available. It is to be pointed out that the data have not necessarily been recorded from autonomous vehicles, but are likely to have been recorded from conventional vehicles controlled by human drivers. This database grows continuously and records data continuously, although it is assumed here that it has frozen and representative content when the test engineer wishes to query it.

The test engineer specifies a query to the central database in the central test planning system (block 9). He wishes to obtain test cases in the real world for the driving situation "slow to a stop in urban traffic". The test planning system analyses the data present in the database, while making use of special analysis algorithms in block 4 in order to classify the data, and delivers a list of identified test cases in block 5 as follows, the respective frequencies being indicated in percent:

a) vehicle slowed to a stop because of an identified obstacle (distance to the stationary obstacle is less than a threshold value): 30% b) vehicle slowed to a stop because of a red traffic light: 30% c) vehicle slowed to a stop because of a stop sign: 10% d) vehicle slowed to a stop because of a pedestrian (with the assumption that automatic pedestrian recognition is possible): 10% e) vehicle slowed to a stop because it is approaching a gas pump: 8% f) vehicle slowed to a stop when required by a police officer: 5% g) vehicle slowed to a stop when it is approaching a railroad crossing with closed barriers: 4% h) vehicle slowed to a stop when it is driving into a drive-in restaurant or the like: 3%

In the next step, a comparative analysis is carried out in block 6, i.e. a mapping between the test cases from the real world (block 5) and the application case-based test cases defined by the test engineer in block 2. In the example above, the test cases a) to d) are mapped onto the test cases defined by the test engineer. The test cases e) to h) have been identified as additional test scenarios at the end of the comparative analysis in block 6 from block 9 on the basis of data of the real world.

After this, the test engineer has the possibility of generating test step instructions (block 8) on the basis of the data from the real world, i.e. to improve the test scenarios. In the case that one of the test cases defined by the test engineer intersects with a test case from the real world, the test case defined by the test engineer may be improved by using the test scenario from the real world. For example, new test steps, new sequence of steps, new alternative event flows, etc. may be added.

At the end of the process, the test engineer finally obtains a set of vehicle test scenarios (block 10), which are formed by the test cases defined by the test engineer (block 2) and by additional test scenarios from the real world (block 6). The test engineer can now test the software, to be tested, for autonomous vehicles with a set of representative and more realistic tests. The test cases obtained in block 10 may either be a description in higher-level programming language or may be a detailed sequence of actions and reactions, depending on requirements.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for testing autonomous vehicles comprising:
   collecting data from vehicles participating in public road traffic;
   analyzing the data to identify a plurality of classifications representative of driving situations and a frequency of occurrence of each of the driving situations;
   generating a first set of real-world test cases from the analyzed data;
   generating a second set of test cases using predefined system application cases;
   performing a comparative analysis between the first set of real-world test cases and the second set of test cases to identify at least one test case from the first set that is comparable with at least one test case from the second set; and
   merging the a least one test case from the first set with its comparable at least one test case from the second set to form a combined test case.

2. The method as claimed in claim 1, further comprising:
   generating a third set of test cases using safety- and reliability-related application cases; and
   performing a second comparative analysis between the third set and a combined set made up of a plurality of combined test cases to identify comparable members thereof; and
   merging the comparable test case members identified to form a further combined set of test cases.

3. The method as claimed in claim 1, wherein the collected data from the vehicles participating in public road traffic represents a real driver experience of drivers of the vehicles.

4. The method as claimed in claim 1 further comprising identifying average test steps and acceptance criteria for all test cases based on real world scenarios by analyzing the collected data.

5. The method as claimed in claim 1, wherein, during the merging, the single case based on the comparable test cases is preserved and modified on the basis of an application case identified from data from real world scenarios.

6. The method as claimed in claim 1 further comprising storing the test cases for test documentation and conduct, wherein the test cases are obtained automatically at a system level.

7. The method as claimed in claim 1 further comprising:
   applying a rule for continuous integration to update the test cases from real-world scenarios; and
   outputting a signal when new test cases from the real-world scenarios are identified.

8. A tool for project life cycle management of autonomous vehicles:
   a test planning system having continuous integration rules and including defined application cases for autonomous vehicles configured to identify test cases with prediction analyses of a reference catalogue of driving situations and the defined application cases, and compare, via a comparative analyses, the test cases and the defined application cases to merge comparable cases with predetermined rules to compile an expanded set of test cases, wherein the expanded set of test cases are compared to the defined application cases to output a complete set of test cases; and
   a central database configured to query the test planning system.

9. The tool as claimed in claim 8, wherein the expanded set of test cases comprises a single case.

10. The tool as claimed in claim 8, wherein the continuous integration rules are configured to regularly update the test cases.

11. The tool as claimed in claim 8, wherein the defined application cases include system and safety and reliability application cases.

12. The tool as claimed in claim 8, wherein the reference catalogue of driving situations includes data from real world scenarios.

13. A test planning system for autonomous vehicle comprising:
    defined application cases for autonomous vehicles configured to identify test cases with prediction analyses of a reference catalogue of driving situations and the defined application cases, and compare, via a comparative analyses, the test cases and the defined application cases to compile an expanded set of test cases, wherein the expanded set of test cases are compared to the defined application cases to output a complete set of test cases; and a central database configured to query the complete set of test cases.

14. The test planning system as claimed in claim 13 further comprising continuous integrations rules configured to regularly update the test case.

15. The test planning system as claimed in claim 13, wherein the comparative analyses is further configure to merge comparable cases using predetermined rules such that the expanded set of test cases defines a single case.

16. The test planning system as claimed in claim 13, wherein the reference catalogue of driving situations includes data from real world scenarios.

17. The test planning system as claimed in claim 13, wherein the complete set of test cases is a test scenario to be defined in order to achieve a representative set of test cases.

\* \* \* \* \*